US012798555B2

(12) United States Patent
Tokuhiro

(10) Patent No.: US 12,798,555 B2
(45) **Date of Patent: *Nov. 17, 2026**

(54) DRIVING ASSISTANCE APPARATUS, DRIVING ASSISTANCE METHOD, AND RECORDING MEDIUM STORING DRIVING ASSISTANCE PROGRAM AND READABLE BY COMPUTER

(71) Applicant: Panasonic Automotive Systems Co., Ltd., Kanagawa (JP)

(72) Inventor: Takafumi Tokuhiro, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 11 days.

This patent is subject to a terminal disclaimer.

(21) Appl. No.: 18/891,863

(22) Filed: Sep. 20, 2024

(65) Prior Publication Data

US 2025/0010848 A1 Jan. 9, 2025

Related U.S. Application Data

(63) Continuation of application No. 18/105,496, filed on Feb. 3, 2023, which is a continuation of application (Continued)

(30) Foreign Application Priority Data

Jun. 5, 2020 (JP) ................................ 2020-098600

(51) Int. Cl.

*B60W 30/06* (2006.01)
*B60W 40/02* (2006.01)

(Continued)

(52) U.S. Cl.

CPC ............ *B60W 30/06* (2013.01); *B60W 40/02* (2013.01); *B60W 50/082* (2013.01);

(Continued)

(58) Field of Classification Search

CPC .... B60W 30/06; B60W 40/02; B60W 50/082; B60W 50/14; B60W 2050/0075;

(Continued)

(56) References Cited

U.S. PATENT DOCUMENTS

| | | | |
|---|---|---|---|
| 10,150,351 | B2 | 12/2018 | Lin et al. |
| 2016/0358453 | A1 | 12/2016 | Wassef et al. |

(Continued)

FOREIGN PATENT DOCUMENTS

| | | |
|---|---|---|
| CN | 109895784 | 6/2019 |
| DE | 102017110020 | 11/2018 |

(Continued)

OTHER PUBLICATIONS

English language translation of Office Action from Japan Patent Office (JPO) in Japanese Patent Appl. No. 2020-098600, dated Apr. 30, 2025.

(Continued)

*Primary Examiner* — Brian Wilson

(74) *Attorney, Agent, or Firm* — Greenblum & Bernstein, P.L.C.

(57) ABSTRACT

A driving assistance method of performing automatic traveling of a vehicle based on a driving operation of a user is provided. The driving assistance method: stores a traveling route traveled by the vehicle according to the driving operation of the user in a training traveling mode; displays the traveling route from a traveling start position to a target parking position in the training traveling mode; and displays a target route from the traveling start position to the target parking position in an automatic traveling mode. The target route in the automatic traveling mode is shorter than the traveling route in the training traveling mode, and a first (Continued)

number of turns of the vehicle in the training traveling mode is same as a second number of turns of the vehicle in the automatic traveling mode.

18 Claims, 13 Drawing Sheets

Related U.S. Application Data

No. 17/336,845, filed on Jun. 2, 2021, now Pat. No. 11,597,382.

(51) Int. Cl.
*B60W 50/08* (2020.01)
*B60W 50/14* (2020.01)
*B60W 50/00* (2006.01)

(52) U.S. Cl.
CPC ..... *B60W 50/14* (2013.01); *B60W 2050/0075* (2013.01); *B60W 2050/146* (2013.01); *B60W 2556/10* (2020.02)

(58) Field of Classification Search
CPC ....... B60W 2050/146; B60W 2556/10; B60W 2554/806; B60W 60/001
See application file for complete search history.

(56) References Cited

U.S. PATENT DOCUMENTS

| | | | | |
|---|---|---|---|---|
| 2018/0224932 | A1 | 8/2018 | Von Novak et al. | |
| 2018/0246515 | A1* | 8/2018 | Iwama | B60W 30/06 |
| 2018/0265130 | A1 | 9/2018 | Derendarz et al. | |
| 2018/0322349 | A1 | 11/2018 | Hayakawa | |
| 2019/0009773 | A1 | 1/2019 | Miyahara et al. | |
| 2019/0039605 | A1 | 2/2019 | Iio et al. | |
| 2019/0176813 | A1* | 6/2019 | Yamada | B60W 30/06 |
| 2019/0256144 | A1 | 8/2019 | Yamada et al. | |
| 2020/0189569 | A1 | 6/2020 | Awan et al. | |
| 2020/0346639 | A1* | 11/2020 | Tashiro | G08G 1/168 |
| 2020/0384987 | A1 | 12/2020 | Preissler | |

FOREIGN PATENT DOCUMENTS

| | | | |
|---|---|---|---|
| DE | 102019115712 A1 * | 12/2020 | G06V 20/586 |
| JP | 2003-112590 | 4/2003 | |
| JP | 2006-321291 | 11/2006 | |
| JP | 2015-214223 | 12/2015 | |
| JP | 2017-138664 | 8/2017 | |
| JP | 2019-099078 | 6/2019 | |
| JP | 2019-127112 | 8/2019 | |
| JP | 2019-142286 | 8/2019 | |
| JP | 2021-526473 | 10/2021 | |
| WO | 2019/223974 | 11/2019 | |

OTHER PUBLICATIONS

English language translation of Office Action from Japan Patent Office (JPO) in Japanese Patent Appl. No. 2024-061576, dated Mar. 11, 2025.

English language translation of the Office Action from Japan Patent Office (JPO) in Japanese Patent Appl. No. 2024-061576, dated Aug. 5, 2025.

Persson et al., "Lambda Twist: An Accurate Fast Robust Perspective Three Point (P3P) Solver.", ECCV 2018, pp. 334-349 (2018).

English language translation of Office Action from Japan Patent Office (JPO) in Japanese Patent Appl. No. 2020-098600, dated Sep. 19, 2023.

English language translation of Office Action issued by the China National Intellectual Property Administration (CNIPA) in Chinese Patent Application No. 202110624280.3, dated Sep. 26, 2023.

English language translation of Office Action from Japan Patent Office (JPO) in Japanese Patent Appl. No. 2020-098600, dated Jan. 23, 2024.

Reconsideration Report by Examiner before Appeal from Japan Patent Office (JPO) in Japanese Patent Appl. No. 2020-098600, dated May 21, 2024.

English language translation of Office Action issued by the German Patent and Trademark Office in German Patent Appl. No. 1020211144248, dated June 14, 2024.

English language translation of the Office Action from Japan Patent Office (JPO) in Japanese Patent Appl. No. 2024-061576, dated Nov. 18, 2025.

English language translation of Office Action from Japan Patent Office (JPO) in Japanese Patent Appl. No. 2024-061576, dated Nov. 12, 2024.

* cited by examiner

IN TRAINING TRAVELING MODE

IN AUTOMATIC TRAVELING MODE

D1a

START POINT → END POINT

| INDEX | TRAVELING POSITION | ORIEN-TATI-ON | TRAVE-LING DIREC-TION | REFERENCE TRAVELING INFORMA-TION |
|---|---|---|---|---|
| WP_1 | X1,Y1 | θ1 | FOR-WARD | Φ1,v1 |
| WP_2 | X2,Y2 | θ2 | FOR-WARD | Φ2,v2 |
| WP_3 | X3,Y3 | θ3 | FOR-WARD | Φ3,v3 |
| ⋮ | | | | |
| WP_N-1 | XN-1,YN-1 | θN-1 | FOR-WARD | ΦN-1, vN-1 |
| WP_N | XN,YN | θN | FOR-WARD | ΦN, vN |
| ⋮ | | | | |
| WP_K-1 | XK-1,YK-1 | θK-1 | BACK-WARD | ΦK-1, vK-1 |
| WP_K | XK,YK | θK | BACK-WARD | ΦK, vK |
| ⋮ | | | | |
| WP_G | XG,YG | θG | BACK-WARD | ΦG, vG |

CONN-ECT ⇒

D1

START POINT → END POINT

| INDEX | TRAVELING POSITION | ORIEN-TATI-ON | TRAVE-LING DIREC-TION | REFERENCE TRAVELING INFORMA-TION |
|---|---|---|---|---|
| WP_1 | X1,Y1 | θ1 | FOR-WARD | Φ1,v1 |
| WP_2 | X2,Y2 | θ2 | FOR-WARD | Φ2,v2 |
| WP_3 | X3,Y3 | θ3 | FOR-WARD | Φ3,v3 |
| ⋮ | | | | |
| WP_N-1 | XN-1,YN-1 | θN-1 | FOR-WARD | ΦN-1, vN-1 |
| WP_K | XK,YK | θK | BACK-WARD | ΦK, vK(=0) |
| ⋮ | | | | |
| WP_G | XG,YG | θG | BACK-WARD | ΦG, vG |

FIG. 4

IN TRAINING TRAVELING MODE

IN AUTOMATIC TRAVELING MODE

DRIVING ASSISTANCE APPARATUS, DRIVING ASSISTANCE METHOD, AND RECORDING MEDIUM STORING DRIVING ASSISTANCE PROGRAM AND READABLE BY COMPUTER

CROSS REFERENCE TO RELATED APPLICATIONS

This is a continuation of U.S. patent application Ser. No. 18/105,496, filed Feb. 3, 2023, which is a continuation of U.S. patent application Ser. No. 17/336,845, filed Jun. 2, 2021 and now U.S. Pat. No. 11,597,382 issued Mar. 7, 2023, which claims priority to Japanese Patent Application No. 2020-098600, filed Jun. 5, 2020. The entire disclosure of each of the above-identified documents, including the specification, drawings, and claims, is incorporated herein by reference in its entirety.

TECHNICAL FIELD

The present disclosure relates to a driving assistance apparatus, a driving assistance method, and a recording medium that stores a driving assistance program and is readable by a computer.

BACKGROUND ART

Parking spaces of houses are generally narrower, and this creates strong needs for automatic driving for parking. Various driving assistance apparatuses are known for such automatic driving. When a driver stops a vehicle at a predetermined initial stop position, such a driving assistance apparatus performs automatic driving to assist in parking the vehicle from the initial stop position to a target parking position in a parking space, for example. The driving assistance apparatus automatically recognizes the parking space and a position of the vehicle, for example, by various sensors mounted on the vehicle, and automatically operates a steering, an accelerator, a brake and so on.

Patent Literature (hereinafter, referred to as "PTL") 1 discloses a technology to realize such automatic driving. According to the technology, a vehicle is traveled from a predetermined position outside a parking space to a target parking position in the parking space by a driving operation of a user riding on the vehicle (hereinafter, simply referred to as a "user"), and the traveling route is stored as training data. This enables the vehicle to be automatically traveled along the traveling route in future parking scenes.

CITATION LIST

Patent Literature

PTL 1
Japanese Patent Application Laid-Open No. 2017-138664

Non Patent Literature

NPL 1
Mikael Persson et al. "Lambda Twist: An Accurate Fast Robust Perspective Three Point (P3P) Solver.", ECCV 2018, pp 334-349, published in 2018, http://openaccess.thecvf.com/content_ECCV_2018/papers/Mikael_Persson_Lambda_TwistAn_ECCV_2018_paper.pdf

SUMMARY OF INVENTION

Technical Problem

According to a driving assistance apparatus employing the technology disclosed in PTL 1, a single training traveling, which is traveling to generate the training data, by the driving operation of the user enables future automatic parking operations. The technology is thus useful.

However, when the user drives the vehicle to the parking space while turning back and forth, which means changing a traveling direction of the vehicle back and forth, the vehicle possibly travels unnecessary routes to change its attitude, i.e., to change its facing directions. That is, a traveling route generated by training traveling possibly includes unnecessary routes.

Thus, in a case where the traveling route of training traveling is used as a target route for automatic parking to the parking space, as the driving assistance apparatus disclosed in PTL 1 does, the vehicle has to perform unnecessary traveling every time.

The present disclosure is made taking into account the above-mentioned problem, and aims to provide a driving assistance apparatus, a driving assistance method, and a driving assistance program each capable of achieving a more suitable parking operation.

Solution to Problem

The present disclosure provides a driving assistance apparatus that assists driving of a vehicle, the driving assistance apparatus comprising: a training data generator that stores a traveling route traveled by the vehicle according to a driving operation of a user in a training traveling mode, and generates training data for a target route based on the traveling route; and a vehicle controller that causes the vehicle to travel along the target route when receiving an execution command for an automatic traveling mode, wherein the training data generator generates the target route by connecting between a first point on the traveling route or a point, on the traveling route, adjacent to the first point and a second point on the traveling route or a point, on the traveling route, adjacent to the second point, in a case where a difference in orientation of the vehicle at the first point and the second point during training traveling is less than a first threshold and a distance between the vehicle at the first point and the vehicle at the second point during the training traveling is less than a second threshold.

In another aspect, the present disclosure provides a driving assistance method that assists driving of a vehicle, the driving assistance method comprising: first processing of storing a traveling route traveled by the vehicle according to a driving operation of a user in a training traveling mode, and generating training data for a target route based on the traveling route; and second processing of causing the vehicle to travel along the target route when an execution command for an automatic traveling mode is received, wherein the first processing comprises generating the target route by connecting between a first point on the traveling route or a point, on the traveling route, adjacent to the first point and a second point on the traveling route or a point, on the traveling route, adjacent to the second point, in a case where a difference in orientation of the vehicle at the first point and the second point during training traveling is less than a first threshold and a distance between the vehicle at the first point and the vehicle at the second point during the training traveling is less than a second threshold.

In still another aspect, the present disclosure provides a recording medium that stores a driving assistance program assisting driving of a vehicle and is readable by a computer, wherein the driving assistance program comprises: first processing of storing a traveling route traveled by the vehicle according to a driving operation of a user in a training traveling mode, and generating training data for a target route based on the traveling route; and second processing of causing the vehicle to travel along the target route when an execution command for an automatic traveling mode is received, wherein the first processing comprises generating the target route by connecting between a first point on the traveling route or a point, on the traveling route, adjacent to the first point and a second point on the traveling route or a point, on the traveling route, adjacent to the second point, in a case where a difference in orientation of the vehicle at the first point and the second point during training traveling is less than a first threshold and a distance between the vehicle at the first point and the vehicle at the second point during the training traveling is less than a second threshold.

Advantageous Effects of Invention

According to the driving assistance apparatus of the present disclosure, it is possible to achieve a more suitable parking operation.

BRIEF DESCRIPTION OF DRAWINGS

FIG. 4 illustrates exemplary training data generated by a training data generator;

DESCRIPTION OF EMBODIMENTS

Hereinafter, a preferred embodiment of the present disclosure will be described in detail with reference to the accompanying drawings. Note that components having substantially the same functions are denoted by the same reference signs in the present specification and drawings, and the repetitive descriptions thereof are omitted.

General Configuration of Vehicle

An exemplary configuration of a vehicle according to an embodiment will be described below with reference to FIG. 1.

Figure 1:
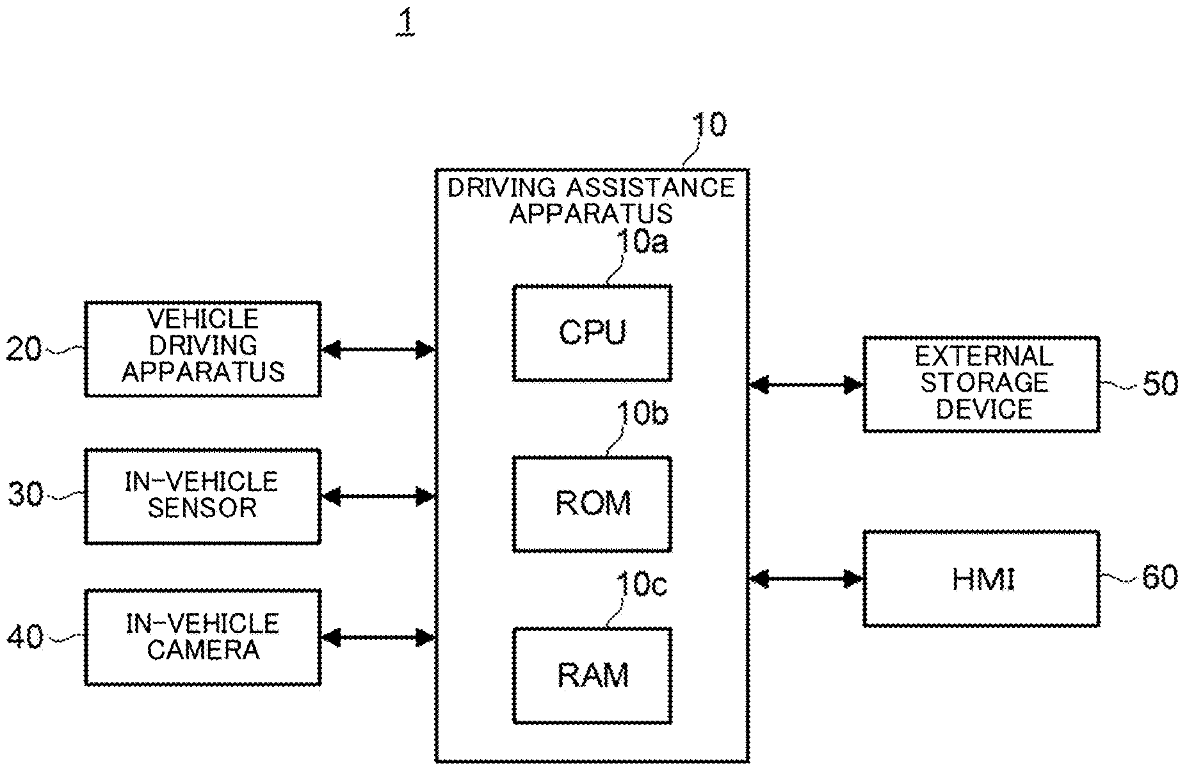
FIG. 1 is a block diagram illustrating an exemplary general configuration of a vehicle.

FIG. 1 is a block diagram illustrating an exemplary general configuration of vehicle 1.

Vehicle 1 includes driving assistance apparatus 10, vehicle driving apparatus 20, in-vehicle sensors 30, in-vehicle camera 40, external storage device 50, and human machine interface (HMI) 60.

Vehicle driving apparatus 20 enables driving, braking, and turning movements required for travel of vehicle 1, and includes, for example, a drive motor, a power transmission mechanism, a braking device, a steering device, and an electronic control unit (ECU) that controls such components. Vehicle driving apparatus 20 drives vehicle 1 by, for example, generating power with the drive motor and transmitting the power to wheels via the power transmission mechanism (e.g., a propeller shaft, a differential gear and a drive shaft). Note that operations of vehicle driving apparatus 20 according to the present embodiment are controlled by driving assistance apparatus 10 during an automatic traveling mode.

In-vehicle sensors 30 are various sensors mounted on vehicle 1 and detect a traveling status of vehicle 1. In-vehicle sensors 30 include, for example, an accelerator opening sensor that detects accelerator opening, a steering angle sensor that detects a steering angle of the steering device, an acceleration sensor that detects acceleration acting on vehicle 1 in a longitudinal direction, a torque sensor that detects torque acting on the power transmission mechanism between the wheels and the drive motor of vehicle 1, and a vehicle speed sensor that detects vehicle speed of vehicle 1. In-vehicle sensors 30 output sensor information obtained by the detection to driving assistance apparatus 10.

In-vehicle camera 40 is an ambient sensor mounted on vehicle 1 and monitors an ambient environment of vehicle 1. In the present embodiment, in-vehicle camera 40 is used for, for example, detecting objects existing around vehicle 1 (typically, objects fixed on the ground) and estimating an existing position of vehicle 1 from a positional relation between vehicle 1 and the objects existing around vehicle 1. In-vehicle camera 40 is composed of four cameras arranged so as to record four directions of the front, rear, left, and right of vehicle 1, for example. In-vehicle camera 40 generates camera images and outputs the images to driving assistance apparatus 10. Note that light detection and ranging (LiDAR), a radar, or an ultrasound sensor, for example, may be used as the ambient sensor for estimating the self-position of vehicle 1, in place of in-vehicle camera 40.

External storage device 50 is an auxiliary storage device such as a hard disk drive (HDD), a solid state drive (SSD), or a flash memory, for example. External storage device 50 stores, for example, training data D1 and map data D2 that are generated in driving assistance apparatus 10 when the vehicle is in a training traveling mode.

HMI 60 is a user interface, such as a touchscreen, a commander, buttons, or operation keys, that receives input operations from a user riding on vehicle 1. HMI 60 is configured to be capable of receiving the input operations such as an execution command for the training traveling mode and an execution command for the automatic traveling mode, for example. HMI 60 outputs the information on the received input operations from the user to driving assistance apparatus 10.

Driving assistance apparatus 10 is an electronic control unit that generally controls each part of vehicle 1. Driving assistance apparatus 10 is configured to cause vehicle 1 to travel automatically (i.e., autonomously) by controlling vehicle driving apparatus 20 while referring to the sensor information acquired from in-vehicle sensors 30 in the automatic traveling mode.

Driving assistance apparatus 10 is configured to include, for example, central processing unit (CPU) 10*a*, read only memory (ROM) 10*b*, random access memory (RAM) 10*c*, an input port (not illustrated), and an output port (not illustrated). Functions of driving assistance apparatus 10, which will be described later, are implemented by CPU 10*a* referring to a control program or various data stored in RAM 10*c* or ROM 10*b*, for example. Note that some or all of the functions of driving assistance apparatus 10 may be implemented by processing of a digital signal processor (DSP) or a dedicated hardware circuit (e.g., ASIC or FPGA), instead of or together with the processing of CPU 10*a*.

Driving assistance apparatus 10 is interconnected with vehicle driving device 20, in-vehicle sensors 30, in-vehicle camera 40, external storage device 50, and HMI 60 via an in-vehicle network (e.g., a communication network conforming to the CAN communication protocol), and is capable of transmitting and receiving required data and control signals to and from each other.

Configuration of Driving Assistance Apparatus

Next, an exemplary configuration of driving assistance apparatus 10 will be described with reference to FIGS. 2A to 7.

Driving assistance apparatus 10 is configured to be capable of switching between the training traveling mode and the automatic traveling mode based on the input operation of the user. The training traveling mode is a mode to register a target route for vehicle 1 to travel automatically in the automatic traveling mode. In the training traveling mode, travel of vehicle 1 is controlled by a driving operation of the user. The automatic traveling mode is a mode to cause vehicle 1 to travel automatically according to the target route registered during the training traveling mode. In the automatic traveling mode, travel of vehicle 1 is automatically controlled by driving assistance apparatus 10 without requiring the driving operation of the user.

Note that driving assistance apparatus 10 according to the present embodiment has a configuration to generate the target route for vehicle 1 to travel automatically, by cutting an unnecessary route due to turns included in the traveling route of vehicle 1 in the training traveling mode.

Figure 2A:
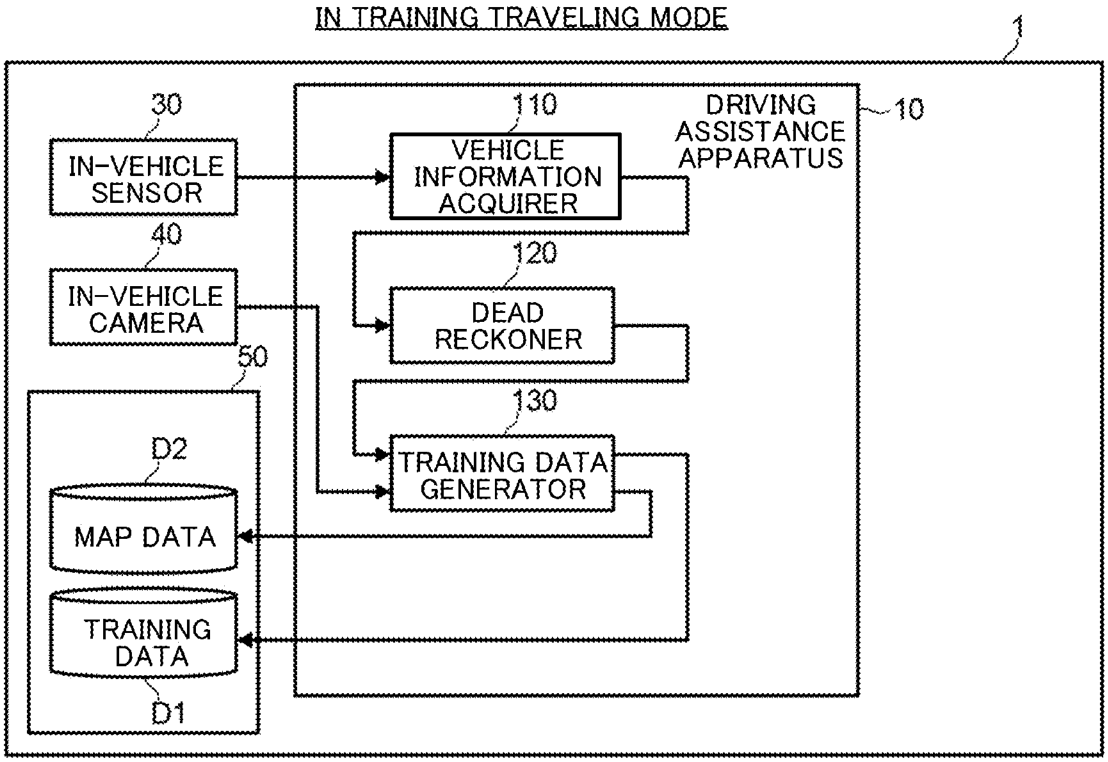
FIG. 2A illustrates exemplary function blocks of a driving assistance apparatus for a training traveling mode.
Figure 2B:
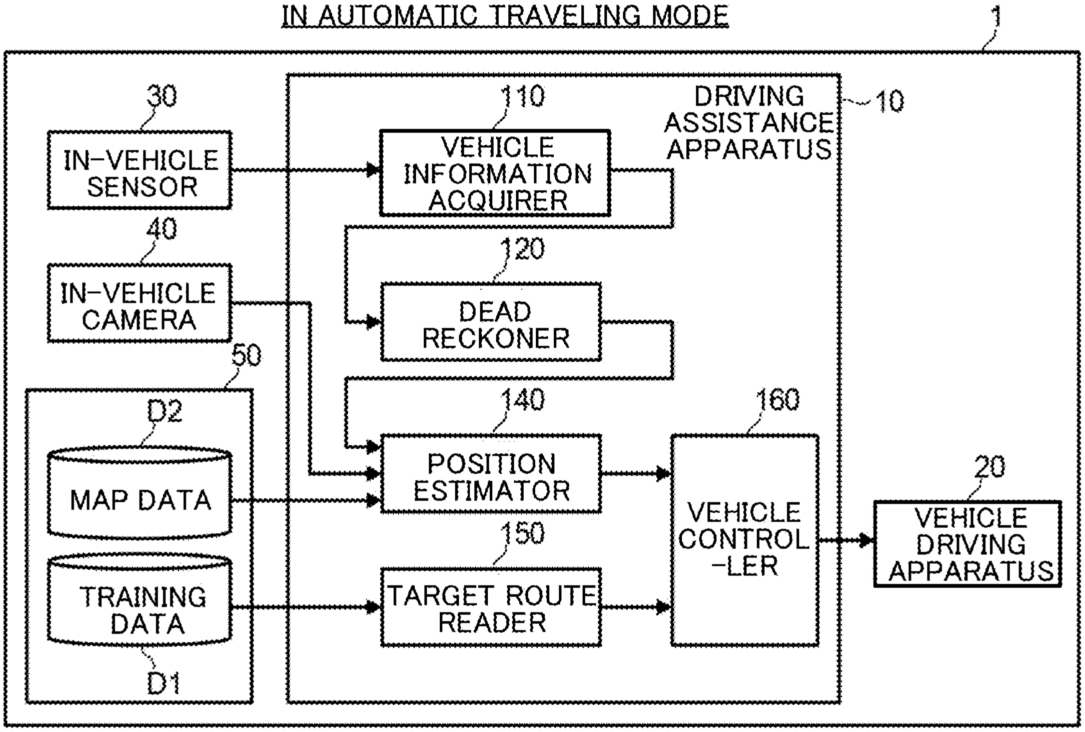
FIG. 2B illustrates exemplary function blocks of the driving assistance apparatus for an automatic traveling mode.

FIGS. 2A and 2B illustrates exemplary function blocks of driving assistance apparatus 10. Note that FIG. 2A illustrates only the function blocks that function when vehicle 1 is in the training traveling mode, and FIG. 2B illustrates only the function blocks that function when vehicle 1 is in the automatic traveling mode.

Figure 3A:
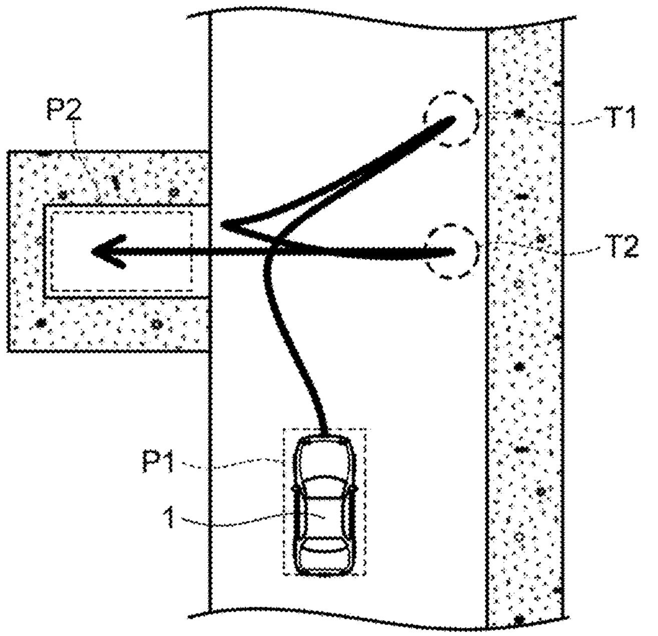
FIG. 3A illustrates an exemplary traveling route (a route indicated by a solid line arrow) traveled by the vehicle in the training traveling mode.
Figure 3B:
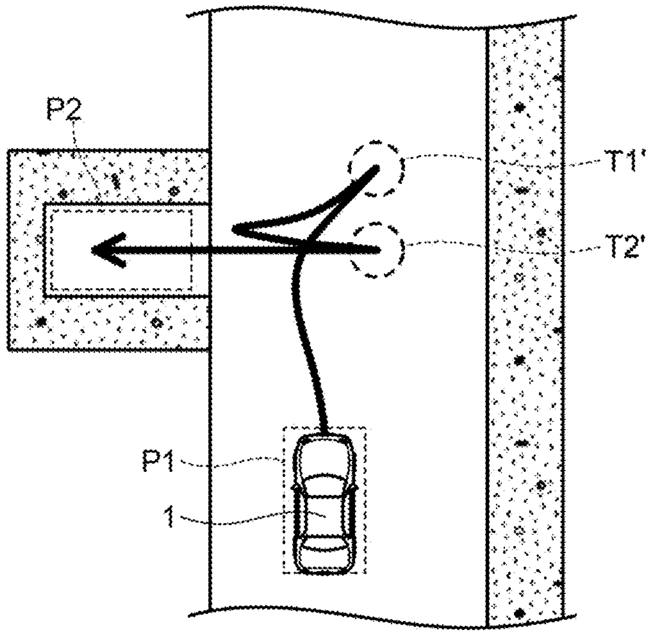
FIG. 3B illustrates an exemplary target route (a route indicated by a solid line arrow) to be traveled by the vehicle in the automatic traveling mode.

FIG. 3A illustrates an exemplary traveling route (a route indicated by a solid line arrow) traveled by vehicle 1 in the training traveling mode. FIG. 3B illustrates an exemplary target route (a route indicated by a solid line arrow) to be traveled by vehicle 1 in the automatic traveling mode.

FIG. 3A illustrates a parking operation in the training traveling mode by the driving operation of the user, from position P1 outside the parking space to target parking position P2 in the parking space. The target route in FIG. 3B is generated based on the traveling route of vehicle 1 in the training traveling mode illustrated in FIG. 3A, and most of the target route is the same as the traveling route. The only changes made to the target route from the original traveling route are points of turn.

To be more specific, vehicle 1 is turned at positions T1 and T2 (here, turned from forward to backward) on the traveling route in FIG. 3A, but the target route in FIG. 3B is generated by cutting unnecessary routes due to the turns of vehicle 1 on the traveling route, and vehicle 1 is turned at positions T1' and T2'.

During Training Traveling Mode

First, a configuration of the functions of driving assistance apparatus 10 that function during the training traveling mode will be described.

During the training traveling mode, vehicle information acquirer 110, dead reckoner 120, and training data generator 130 function in driving assistance apparatus 10 (see FIG. 2A).

Vehicle information acquirer 110 acquires sensor information indicating a traveling status of vehicle 1 from in-vehicle sensors 30. Vehicle information acquirer 110 then transmits the acquired sensor information to dead reckoner 120.

Dead reckoner 120 estimates the current position of vehicle 1 based on temporal changes of sensor values from in-vehicle sensors 30 that detect the traveling status of vehicle 1. Dead reckoner 120 calculates a movement amount of vehicle 1 from a reference position (e.g., a traveling start position at the start of the training traveling mode) based on, for example, temporal changes in the vehicle speed and the yaw rate indicated by in-vehicle sensors 30, and estimates the current position of vehicle 1 based on the movement amount.

The current position of vehicle 1 estimated by dead reckoner 120 is an approximate current position of vehicle 1. Position estimation by dead reckoner 120 has low estimation accuracy, and thus, in driving assistance apparatus 10 according to the present embodiment, the estimated current position of vehicle 1 is corrected to the actual current position based on camera images generated by in-vehicle camera 40. The position estimation by dead reckoner 120 has low estimation accuracy because, for example, 1) it is difficult to construct a complete kinematic model (e.g., a tire diameter and a tread width), 2) observation values of in-vehicle sensors 30 always include noise, and 3) external factors (e.g., slip of the tire) that cannot be observed by in-vehicle sensors 30 greatly affect the position estimation. Additionally, the position estimation by dead reckoner 120 accumulates errors due to these circumstances.

Training data generator 130 stores the traveling route of the training traveling, and generates, from the traveling route, training data D1 related to the target route for vehicle 1 to travel automatically in the automatic traveling mode (hereinafter, simply referred to as a "target route"). For example, training data generator 130 starts storage of the traveling route in response to a command of starting the training traveling mode from the user, and terminates the storage of the traveling route in response to a command of terminating the training traveling mode from the user. The training traveling typically starts with vehicle 1 stopped at a desired position outside the parking space (P1 in FIG. 3A), and terminates with vehicle 1 stopped at a parking target position in the parking space (P2 in FIG. 3A). Note that training data D1 generated by training data generator 130 is stored in external storage device 50.

FIG. 4 illustrates exemplary training data D1 generated by training data generator 130. Data D1_a_ illustrated in FIG. 4 is data indicating the actual traveling route of vehicle 1 and a traveling state at each point on the traveling route, which are sequentially stored during the training traveling, and training data D1 is generated from data D1_a_ of the training traveling.

Figure 5:
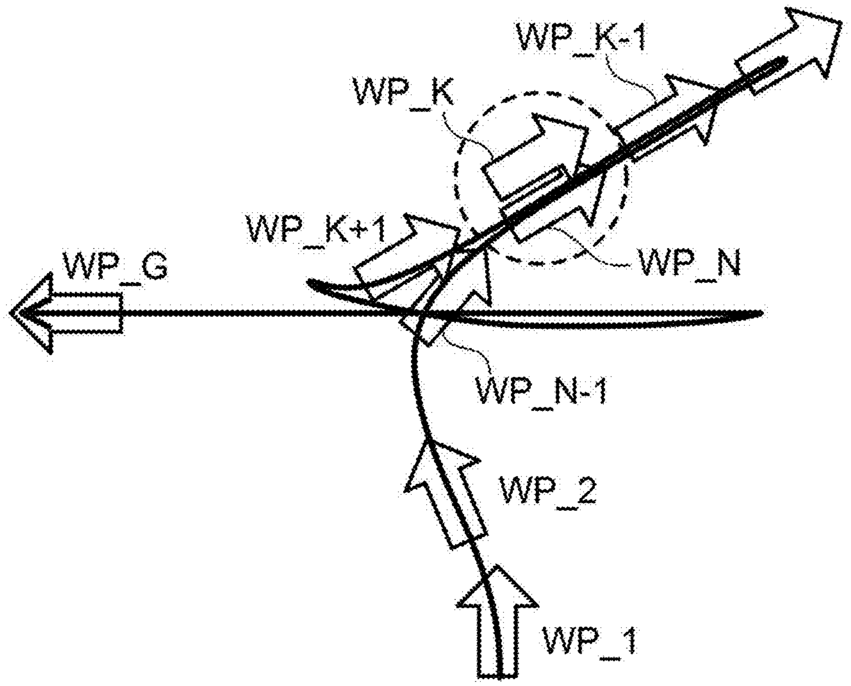
FIG. 5 is a diagram describing an exemplary method for generating the training data.

FIG. 5 is a diagram describing an exemplary method for generating training data D1.

Note that FIGS. 4 and 5 describe processing of cutting unnecessary routes before and after point of turn T1 in FIG. 3. WP_1, WP_2, . . . , WP_G in FIGS. 4 and 5 represent in order each point of the traveling route of vehicle 1 stored during the training traveling. WP_1 corresponds to the start point of the traveling route, and WP_G corresponds to the end point of the traveling route.

Training data D1 includes, for example, the target route for vehicle 1 to travel automatically, the orientation (i.e., the facing direction) of vehicle 1 at each target point on the target route, the traveling direction (i.e., forward or backward) of vehicle 1 at each target point on the target route, and reference traveling information at each target point on the target route.

The "target route" of training data D1 is generated by, for example, deleting the unnecessary routes before and after the point of turn in data D1_a_ of the traveling route in the training traveling, and connecting the routes before and after the unnecessary routes.

To be more specific, training data generator 130 searches, according to connection conditions, for a pair of the first and second points that have the point of turn in the traveling direction in between on the traveling route of the training traveling. The connection conditions are that a difference in the orientation of vehicle 1 at the first and second points in the training traveling is less than the first threshold, and that the distance between vehicle 1 at the first point and vehicle 1 at the second point is less than the second threshold. When the pair of the first and second points satisfying the connection conditions are detected, training data generator 130 connects between the first point or a point adjacent to the first point on the traveling route and the second point or a point adjacent to the second point on the traveling route, and generates the target route by shortening the traveling route at the connection position. That is, training data generator 130 configures the connection position of the first point (or the point adjacent to the first point on the traveling route) and the second point (or the point adjacent to the second point on the traveling route) as a point of turn of vehicle 1 on the target route, instead of the point of turn on the traveling route of the training traveling.

Note that the first threshold for the difference in the orientation (the orientation of vehicle 1 when vehicle 1 passes the points) serving as a reference of the connection conditions is, for example, a value of 0 degrees or more and 3 degrees or less. In addition, the second threshold for the distance serving as another reference of the connection conditions is, for example, a value of 0 m or more and 1 m or less.

Training data generator 130 performs such processing because the pair of the first and second points satisfying the connection conditions can be regarded as substantially the same point where vehicle 1 passes with substantially the same attitude before and after the point of turn of vehicle 1 on the traveling route during the training traveling. In other words, the route between the pair of the first and second points and the point of turn on the traveling route is an unnecessary route that has no effect on the attitude change of vehicle 1. Note that a pair of points WP_N and WP_K on the traveling route in FIG. 5 correspond to the pair of the first and second points satisfying the connection conditions.

When training data generator 130 generates the target route, the route between the connected two points is preferably not orthogonal to the routes before and after the two points. Thus, training data generator 130 configures, for at least one of the first point and the second point, the point adjacent to the first or second point on the traveling route as a connection target. For example, in FIG. 5, it is preferable to connect between point WP_N−1 and point WP_K, instead of connecting between point WP_N and point WP_K which are the pair satisfying the connection conditions. That is, in FIG. 5, the target route is preferably configured so that vehicle 1 travels forward to point WP_K after point WP_N−1, and turns at point WP_K (see the connection position of training data D1 in FIG. 4).

This prevents vehicle 1 from traveling laterally (i.e., in the vehicle width direction) at the connecting position on the target route, and enables vehicle 1 to travel smoothly on the target route. Further, configuring point WP_N−1 as one of the connection targets instead of point WP_N (i.e., shifting the point, which is from the pair of the first and second points, on the start point side of the traveling route by one point closer to the start point), as illustrated in FIG. 5, prevents the steering angle from being excessively large when vehicle 1 travels along the traveling route from point WP_K.

Note that exemplary processing of generating the target route in training data generator 130 will be described later with reference to FIG. 8.

The "orientation" of vehicle 1 at each target point on the target route and the "traveling direction" of vehicle 1 at each target point on the target route included in training data D1 are, for example, the direct reflection of the orientation and the traveling direction of vehicle 1 during the training traveling.

In addition, the "reference traveling information" at each target point on the target route included in training data D1 is, for example, traveling information (e.g., the steering angle and the vehicle speed) detected at each point on the traveling route during the training traveling of vehicle 1. This reference traveling information is used as a reference (e.g., referred to as a feed-forward element) when vehicle controller 160, which will be described later, controls vehicle driving apparatus 20 (e.g., the steering angle of the steering device) at each point on the traveling route in performing automatic traveling.

Note that training data generator 130 preferably changes the vehicle speed at the connection position (here, at point WP_K) on the target route, among the elements of the "reference travel information" at each target point on the target route in training data D1, to zero [m/sec] from the vehicle speed in the training traveling. This prevents a rapid change in the vehicle speed when vehicle 1 turns at the connecting position.

Incidentally, training data generator 130 generates training data D1 while generating map data D2 for estimating the current position of vehicle 1 from the camera images of in-vehicle camera 40, for example. This technique is also referred to as a simultaneous localization and mapping (SLAM) method.

Figure 6:
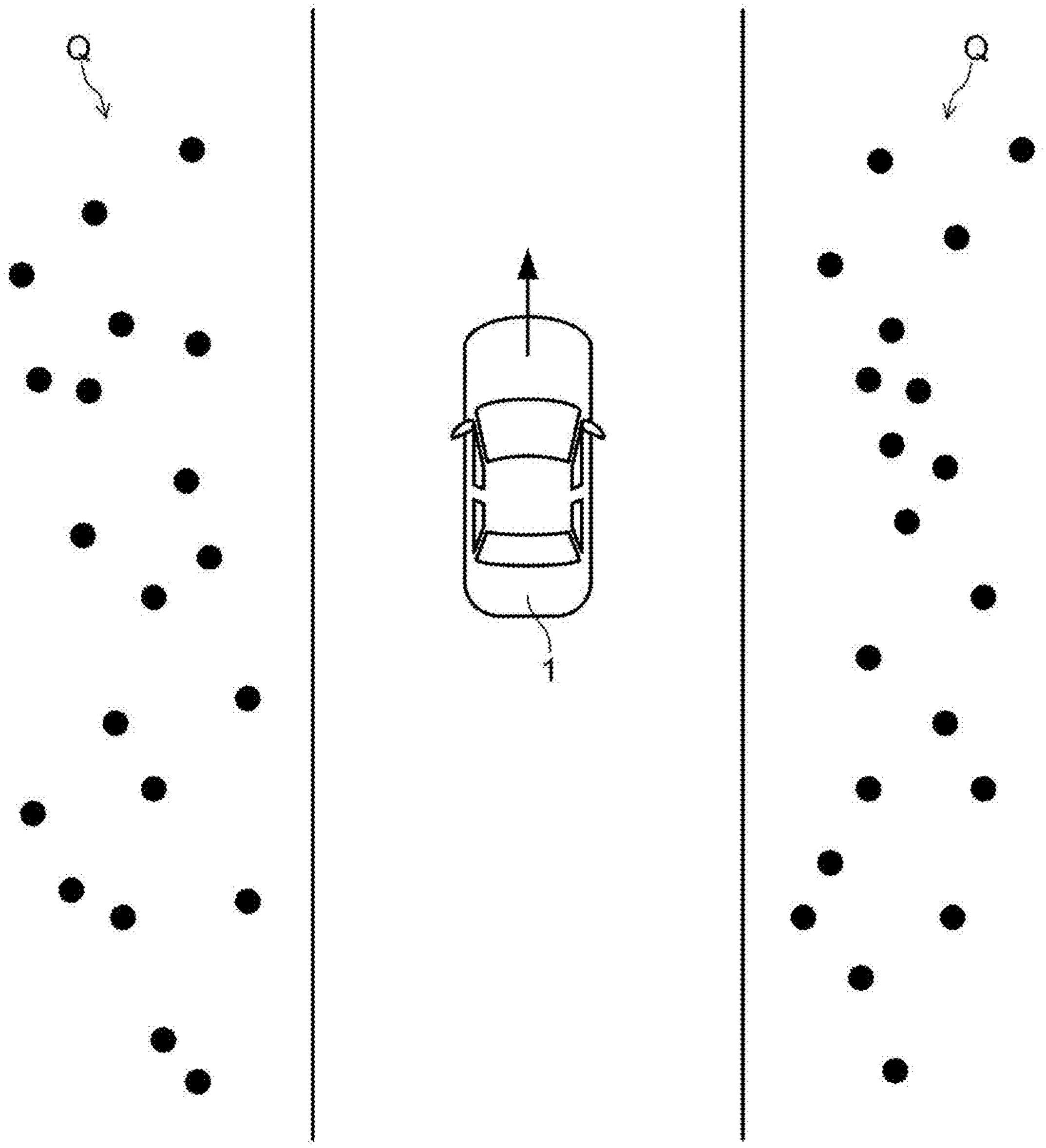
FIG. 6 illustrates an exemplary map data generated by the training data generator.

FIG. 6 illustrates exemplary map data D2 generated by training data generator 130. FIG. 6 is a bird's-eye view illustrating real space positions of characteristic points Q in a real scene stored in map data D2.

Map data D2 is data that stores, for each of a plurality of characteristic points in a real scene, a three-dimensional position of the characteristic point in the real space in association with a characteristic amount of the characteristic point obtained from a camera image taken at the time of generating map data D2. The characteristic points stored as map data D2 are, for example, portions (e.g., corner portions) where characteristic image patterns are obtained from the camera images of objects (e.g., a tree, a wall, or a pillar) that can serve as marks in the real scene. Note that the plurality of characteristic points in map data D2 are stored individually identifiable by identification numbers, for example.

The three-dimensional positions in the real space of the characteristic points stored in map data D2 are represented by a three-dimensional orthogonal coordinate system (X, Y, Z).

The characteristic amount of the characteristic point stored in map data D2 includes, for example, a scale invariant feature transform (SIFT) characteristic amount, or a speeded up robust features (SURF) characteristic amount, as well as the brightness and the density on the camera image. Note that characteristic amount data of the characteristic point stored in map data D2 may be separately stored for each shooting position and shooting direction of a camera in shooting the characteristic point, even for the characteristic point at the same three-dimensional position. In addition, the characteristic amount data of the characteristic point stored in map data D2 may be stored in association with the image of the object having the characteristic point.

Training data generator 130 identifies the coordinates of the characteristic points in the real scene based on stereo photogrammetry, for example. To be more specific, training data generator 130 reads a plurality of camera images generated at different timings, and associates the identical characteristic points commonly appeared in the plurality of camera images. Next, training data generator 130 acquires, from dead reckoner 120, information on the temporary position of vehicle 1 when the plurality of camera images are generated, for example, and identifies the temporary coordinates of the characteristic points in the real scene by a principle of triangulation. Subsequently, training data generator 130 performs bundle adjustment, for example, using the temporary position of vehicle 1 and the temporary coordinates of the characteristic points in the real scene as reference information, and calculates the official position of vehicle 1 and the official coordinates of the characteristic points in the real scene so as to minimize reprojection errors when each characteristic point in the real scene is projected onto all the camera images. Training data generator 130 then stores the official position of vehicle 1 as data D1*a* indicating the position of vehicle 1 during the training traveling. Training data generator 130 also stores the official coordinates of the characteristic points in the real scene as map data D2 in external storage device 50.

Note that map data D2 may be generated in advance using light detection and ranging (LiDAR) or a stereo camera, instead of using the SLAM method. However, distortion is often included depending on the measurement method in generating map data D2, and it is thus preferable to use the SLAM method from the viewpoint of preventing deterioration of position estimation accuracy caused by the distortion of map data D2.

During Automatic Traveling Mode

Next, a configuration of the functions of driving assistance apparatus 10 that function during the automatic traveling mode will be described.

During the automatic traveling mode, vehicle information acquirer 110, dead reckoner 120, position estimator 140, target route reader 150, and vehicle controller 160 function in driving assistance apparatus 10 (see FIG. 2B).

Vehicle information acquirer 110 and dead reckoner 120 have the same configuration as those described above, and the description thereof is thus omitted.

Position estimator 140 estimates the current position of vehicle 1 based on map data D2 and camera images of in-vehicle camera 40.

Figure 7:
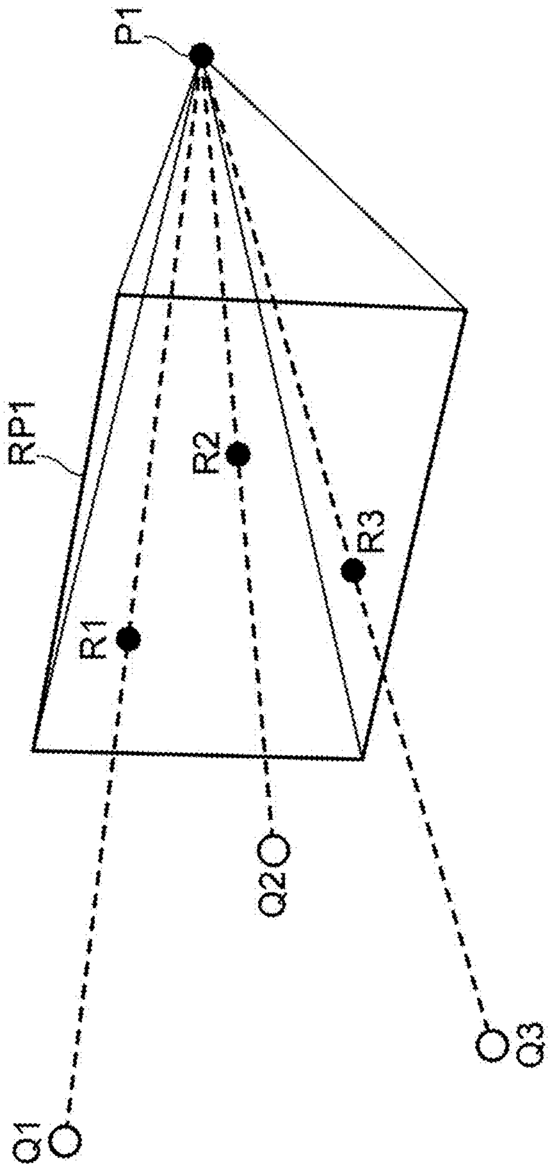
FIG. 7 is a diagram describing exemplary processing in a position estimator.

FIG. 7 is a diagram describing exemplary processing in position estimator 140. Points R1, R2, and R3 in FIG. 7 represent three characteristic points extracted from the camera image of in-vehicle camera 40. Points Q1, Q2, and Q3 represent three-dimensional positions of characteristic points R1, R2, and R3 in the real space, and are stored in map data D2. RP1 represents an imaging surface of in-vehicle camera 40. Point P1 represents the position of in-vehicle camera 40 (i.e., the position of vehicle 1) determined from three characteristic points R1, R2, and R3 extracted from the camera image of in-vehicle camera 40 and points Q1, Q2, and Q3 stored in map data D2.

For example, position estimator 140 first collates the characteristic points extracted from the camera image of in-vehicle camera 40 with the characteristic points stored in map data D2 using, for example, pattern matching and characteristic amount search. Position estimator 140 then randomly selects several (e.g., three to six) characteristic points among the characteristic points that are extracted from the camera image of in-vehicle camera 40 and are matched with the characteristic points stored in map data D2, and estimates the position of vehicle 1 in the real space based on the positions of the several characteristic points in the camera image and the three-dimensional positions of the several characteristic points in the real space stored in map data D2. At this time, position estimator 140 calculates the position of vehicle 1 by solving a PnP problem using a known method such as Lambda Twist (see, for example, Non Patent Literature 1).

Note that, when position estimator 140 collates the characteristic points extracted from the camera image of in-vehicle camera 40 with the characteristic points stored in map data D2, the characteristic points stored in map data D2 may be narrowed down to the characteristic points to be collated with the characteristic points extracted from the camera image of in-vehicle camera 40, based on the current position of vehicle 1 estimated by dead reckoner 120, for example.

Information on the current position of vehicle 1 estimated by position estimator 140 is transmitted to vehicle controller 160. Note that the information on the current position of vehicle 1 estimated by position estimator 140 includes, for example, information on the two-dimensional position (the X-coordinate and the Y-coordinate) of vehicle 1 in the real space, and information on the orientation (i.e., direction) of vehicle 1.

Target route reader 150 reads training data D1 for moving vehicle 1 from external storage device 50, and transmits training data D1 to vehicle controller 160.

When an execution command for the automatic traveling mode is received from a user, vehicle controller 160 moves vehicle 1 along the target route indicated by training data D1 acquired from target route reader 150 while recognizing the current position of vehicle 1. Then, vehicle controller 160 stops vehicle 1 at the end point of the target route (i.e., at a position corresponding to the end point of the traveling route in the training traveling).

Vehicle controller 160 typically controls the travel of vehicle 1 (e.g., the steering angle of the steering device of vehicle 1) by feedback control based on the current position of vehicle 1 estimated by position estimator 140 and the target points on the target route indicated by training data D1. Such control is performed because the initial position of vehicle 1 at the start of the automatic traveling mode does not always exactly correspond to the initial position of the target route indicated by training data D1. In addition, reproducing the traveling route with dead reckoning only is likely to increase errors, particularly in a low-speed range and on a traveling route with turns. Further, since the target route for the automatic traveling is generated by making changes to the traveling route of the training traveling, the actual traveling route possibly deviates from the target route when the vehicle speed or the steering angle in the training traveling is directly applied.

Note that vehicle controller 160 may use the reference traveling information (the vehicle speed, the steering angle, etc.) configured in training data D1 as a feed-forward element.

When vehicle controller 160 causes vehicle 1 to travel automatically, vehicle 1 does not necessarily start the automatic traveling from the position of the start point of the target route indicated in training data D1, and may start from the position between the start point and the end point of the target route indicated in training data D1. In this case, vehicle controller 160 only needs to determine the most accessible target point among the target points between the start point and the end point of the target route indicated in training data D1, based on the initial position and the orientation of vehicle 1 at the start of the automatic traveling mode, for example, using a predetermined evaluation function. This allows vehicle 1 to get on the target route smoothly even when the initial position of vehicle 1 is off the start point of the target route.

Operation of Driving Assistance Apparatus

Figure 8:
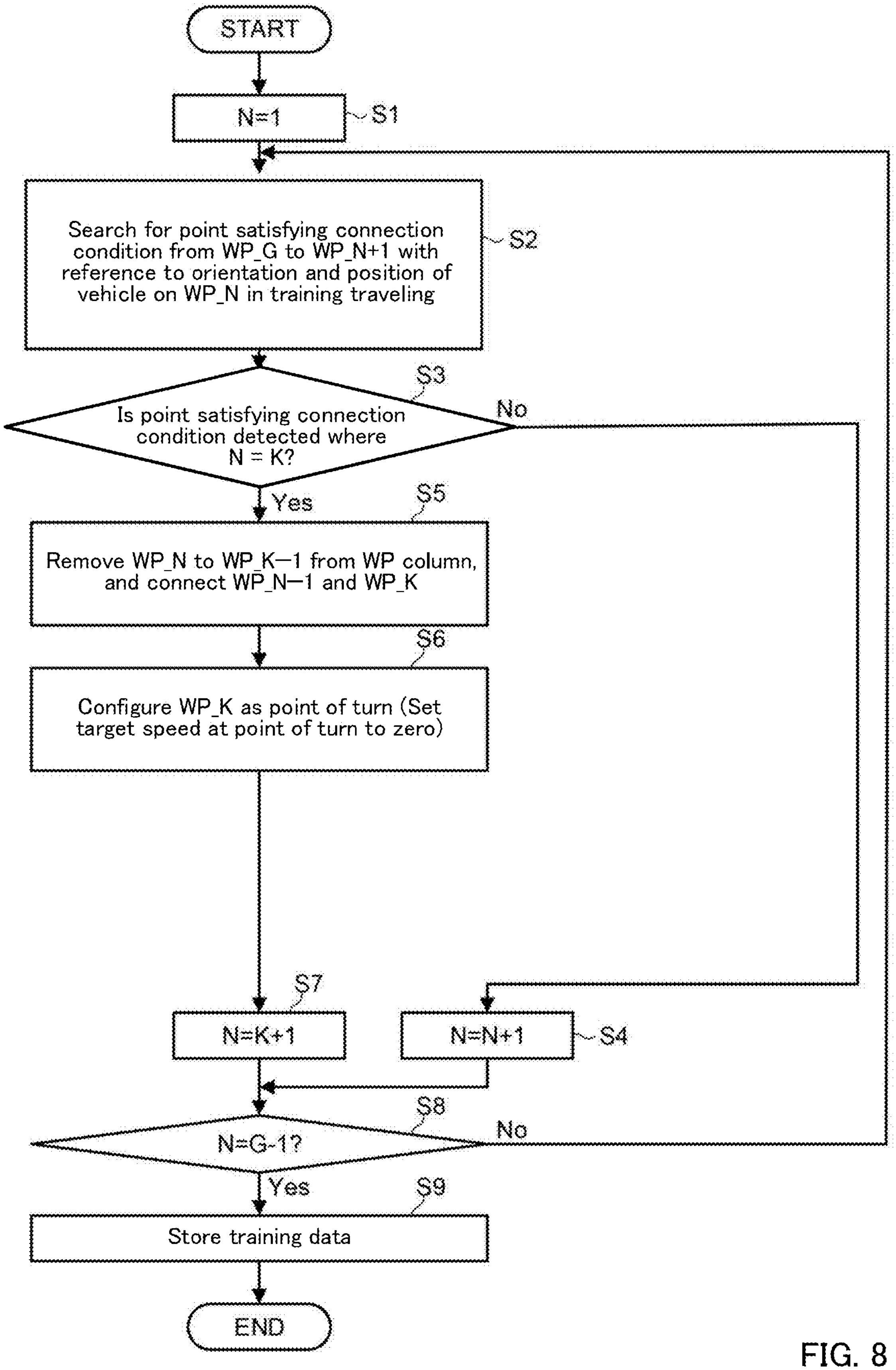
FIG. 8 is a flowchart describing an exemplary operation of the driving assistance apparatus for generating the target route.

FIG. 8 is a flowchart describing an exemplary operation when driving assistance apparatus 10 (training data generator 130) generates a target route. The flowchart illustrated in FIG. 8 is processing performed by driving assistance apparatus 10 after training traveling, for example. Note that the flowchart in FIG. 8 uses WP_N as a variable representing one of candidate points for the pair satisfying the connection conditions (hereinafter, referred to as a "two-point pair"), among points WP_1, WP_2, . . . , WP_G on a traveling route.

In Step S1, driving assistance apparatus 10 first sets N=1, and configures the one of the candidate points for the two-point pair to be a starting point on the traveling route.

In Step S2, driving assistance apparatus 10 searches for a point satisfying the connection conditions from point WP_G to point WP_N−1 on the traveling route, with reference to the orientation and the position of vehicle 1 on point WP_N in the training traveling. That is, driving assistance apparatus 10 searches, on the traveling route, for the point satisfying the connection conditions and to be paired with point WP_N in the order from the end point of the traveling route. This allows detecting a point closest to the end point of the traveling route first when there is the point satisfying the connection condition and to be paired with point WP_N on the traveling route.

In Step S3, driving assistance apparatus 10 determines whether the point satisfying the connection conditions is detected at any point from point WP_G to point WP_N+1 on the traveling route. When the point satisfying the connection conditions is not detected at any point from point WP_G to point WP_N+1 on the traveling route (NO in S3), driving assistance apparatus 10 proceeds the processing to step S4. When the point satisfying the connection conditions is detected at some point (e.g., point WP_K in this case) from point WP_G to point WP_N+1 on the traveling route (YES in S3), driving assistance apparatus 10 proceeds the processing to Step S5.

In Step S4, driving assistance apparatus 10 increases N to N+1 for the one of the candidate points for the two-point pair (i.e., shifts the one of the candidate points for the two-point pair by one point toward the end point of the traveling route), and proceeds the processing to step S8.

In Step S5, driving assistance apparatus 10 removes WP_N to WP_K−1 from the WP column of data D1*a* related to the traveling route generated in the training traveling, and connects between WP_N−1 and WP_K. This generates training data D1 related to the target route in which the unnecessary route is deleted from the traveling route of the training traveling (see FIGS. 4 and 5).

In Step S6, driving assistance apparatus 10 configures point WP_K as a point of turn in training data D1. To be more specific, driving assistance apparatus 10 changes the vehicle speed to zero for training data D1 at point WP_K in data D1*a* related to the traveling route generated in the training traveling since the vehicle speed at point WP_K is non-zero in the training traveling. Note that driving assistance apparatus 10 may also change the vehicle speed to a value close to zero at the points before and after point WP_K (such as WP_K+1 and WP_N−1) from the viewpoint of further preventing the change in the vehicle speed at the time of turning.

In Step S7, driving assistance apparatus 10 increases N to K+1 for the one of the candidate points for the two-point pair, and proceeds the processing to step S8. Note that N is increased to K+1 because points WP_N to WP_K−1 are removed by the processing in Step S5.

In Step S8, driving assistance apparatus 10 determines whether the variable related to the one of the candidate points for the two-point pair is increased to G−1 (N=G−1). When the variable related to the candidate points is not increased to G−1 (NO in S8), driving assistance apparatus 10 returns to Step S2 and performs the same processing. When the variable related to the candidate points is increased to G−1 (YES in S8), driving assistance apparatus 10 proceeds the processing to Step S9.

In Step S9, driving assistance apparatus 10 stores training data D1 generated by Steps S2 to S8 in external storage device 50.

The processing described above generates the target route in which the unnecessary route is deleted from the traveling route of the training driving.

Effect

As described above, driving assistance apparatus 10 according to the present embodiment searches the pair of the first and second points that have the point of turn in the traveling direction in between on the traveling route. The conditions to be the first and second points are that a difference in the orientation of vehicle 1 at the first and second points in the training traveling is less than the first threshold, and that the distance between vehicle 1 at the first point and vehicle 1 at the second point is less than the second threshold. When the pair is detected, driving assistance apparatus 10 connects between the first point or the point adjacent to the first point on the traveling route and the second point or the point adjacent to the second point on the traveling route, and generates the target route for the automatic traveling by shortening the traveling route at the connection point.

This enables vehicle 1 to travel to the target parking position without following the unnecessary route when vehicle 1 is automatically parked to the target parking position in the parking space during the automatic traveling. This reduces the traveling time of the automatic traveling, and enables optimization of vehicle traveling.

Note that the following has also been studied as a method of generating the target route according to the conventional technology. According to the method, the route is automatically generated by storing only a start point, a point of turn and an end point of a traveling route, for example, and using arithmetic processing with an evaluation function so as to smoothly connect the three points. Such a method, however, optimizes between the three points by an evaluation score, and thus a vehicle passes a place where a user does not want to pass (e.g., turf) or an impassable place that is difficult to be detected as an obstacle by sensors (e.g., a thin pole, a chain, and a pond) even in a case where the user has intentionally avoided such places during training traveling.

Driving assistance apparatus 10 according to the present embodiment, however, basically controls vehicle 1 to travel along a route intended by a user, thereby preventing the problem as in the conventional technology.

(Variation 1)

The above embodiment has described a case where training data generator 130 connects, when generating a target route, a pair of two points that have different traveling directions from each other and have a point of turn in the traveling direction in between. However, training data generator 130 may connect, when generating a target route, a pair of two points that have the identical traveling direction as long as the pair of two points have the point of turn in the traveling direction in between and satisfy the connection conditions.

Figure 9A:
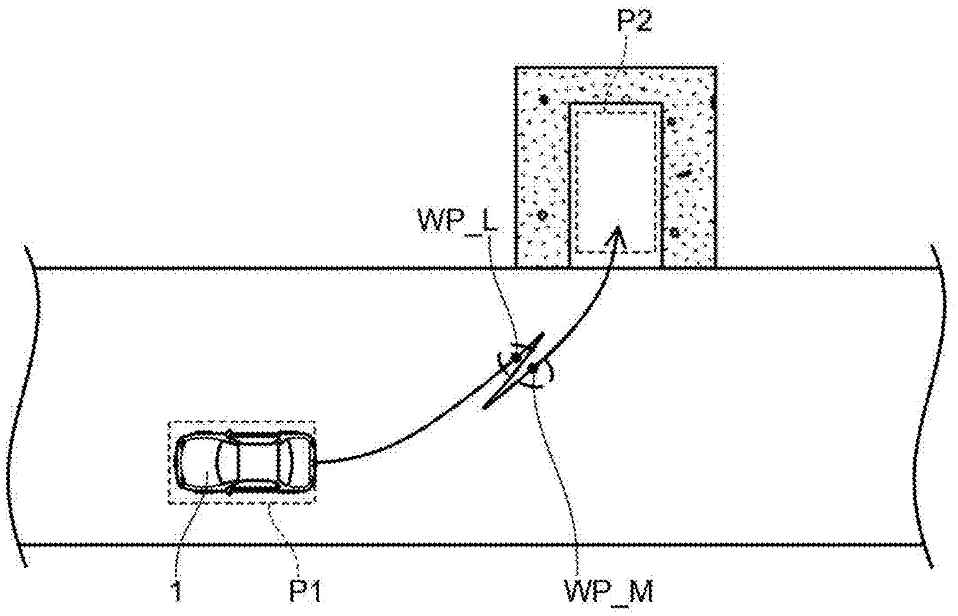
FIG. 9A illustrates an exemplary traveling route (a route indicated by a solid line arrow) traveled by the vehicle in the training traveling mode according to Variation 1.
Figure 9B:
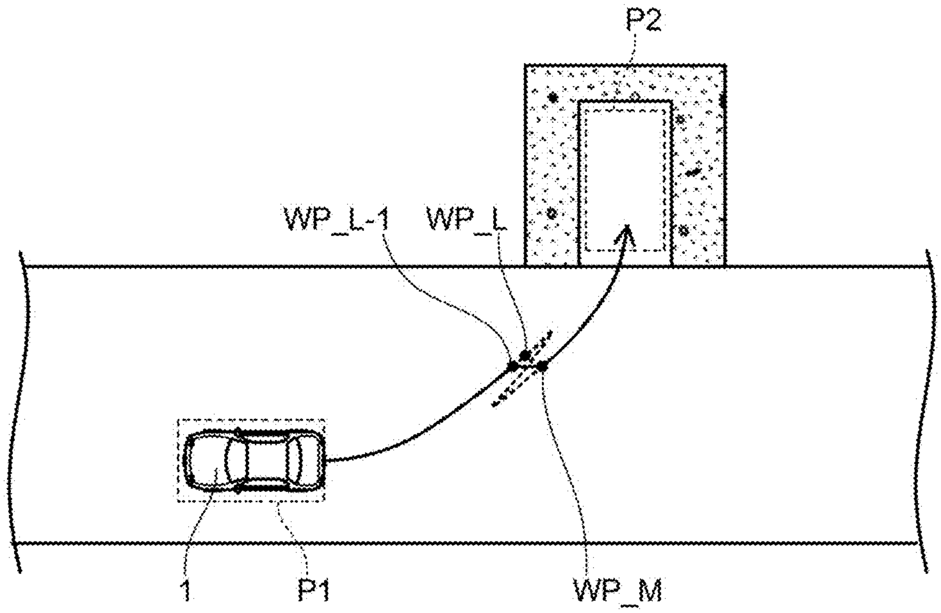
FIG. 9B illustrates an exemplary target route (a route indicated by a solid line arrow) to be traveled by the vehicle in the automatic traveling mode according to Variation 1.

FIG. 9A illustrates an exemplary traveling route (a route indicated by a solid line arrow) traveled by vehicle 1 in the training traveling mode according to Variation 1. FIG. 9B illustrates an exemplary target route (a route indicated by a solid line arrow) to be traveled by vehicle 1 in the automatic traveling mode according to Variation 1.

FIG. 9A describes a case where vehicle 1 turns in the traveling direction twice when traveling from position P1 outside the parking space to target parking position P2 in the parking space by a driving operation of a user. When searching a pair, training data generator 130 determines that the pair of point WP_L and point WP_M on the traveling route satisfy the conditions that the difference in the orientation is less than the first threshold and the distance is less than the second threshold. Thus, in Variation 1, training data generator 130 generates the target route by connecting between point WP_L−1 (the point adjacent to point WP_L on the start point side on the traveling route) and point WP_M, as illustrated in FIG. 9B. Note that the traveling direction at point WP_L and the traveling direction at point WP_M are identical to each other (i.e., backward traveling) in this case.

Such a configuration can also generate the target route without unnecessary routes on the traveling route of the training traveling. In this case, however, vehicle 1 travels without turning at the connection position of the two points (the connection position may be referred to as a "non-point of turn"). The user feels uncomfortable when vehicle 1 stops at the connection position of the two points during the automatic traveling in such a situation as in the embodiment described above. Thus, in Variation 1, training data generator 130 preferably sets the vehicle speed at the connection position to non-zero (e.g., keeps the vehicle speed of the training traveling) in the case of connecting two points that have the identical traveling direction.

Figure 10:
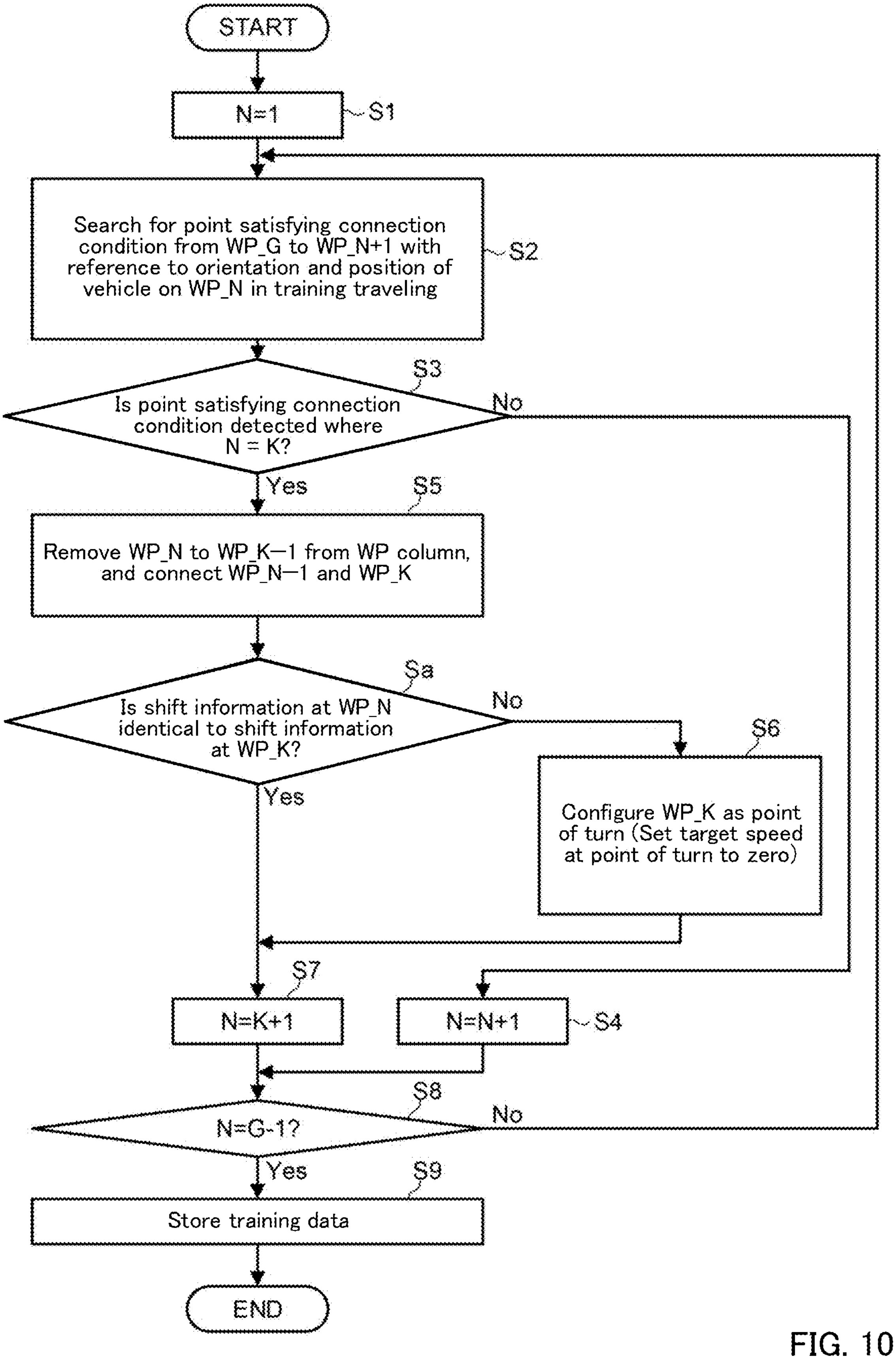
FIG. 10 is a flowchart describing an exemplary operation of the driving assistance apparatus for generating the target route, according to Variation 1.

FIG. 10 is a flowchart describing an exemplary operation when driving assistance apparatus 10 (training data generator 130) generates the target route, according to Variation 1. The processing of Steps S1 to S9 is the same as the processing described in the flowchart in FIG. 8. The difference from the flowchart in FIG. 8 is that this flowchart includes Step Sa between Step S4 and Step S5.

Step Sa is performed after the pair of two points WP_N and WP_K, which satisfy the connection conditions, is detected and point WP_N−1 and WP_K, which respectively correspond to the pair of the two points, are connected.

In Step Sa, driving assistance apparatus 10 refers to shift information at point WP_N and shift information at point WP_K in the training traveling, for example, and determines whether the traveling direction at point WP_N and the traveling direction at point WP_K are identical or opposite to each other. When the traveling direction at point WP_N and the traveling direction at point WP_K are opposite (No in Step Sa), driving assistance apparatus 10 configures the connection position (here, point WP_K) as the point of turn in training data D1 (Step S6), and proceeds the processing to Step S7. When the traveling direction at point WP_N and the traveling direction at point WP_K are identical to each other (Yes in Step Sa), driving assistance apparatus 10 proceeds the processing to Step S7 without configuring the connection position (here, point WP_K) as the point of turn in training data D1.

When the connection position is configured as the point of turn in training data D1 (Step S6), driving assistance apparatus 10 sets the target vehicle speed to zero at the connection position (here, point WP_K) configured in training data D1, for example, as in the embodiment described above. When the connection position is not configured as the point of turn in training data D1, in contrast, driving assistance apparatus 10 sets the target vehicle speed to the vehicle speed in the training traveling at the connection position (here, point WP_K) configured in training data D1, for example.

As described above, the target route configuration method according to Variation 1 allows, in some cases, configuring a more optimal target route than the target route configuration method according to the above embodiment.

(Variation 2)

In the embodiment described above, training data generator 130 applies the same connection conditions (the first threshold for the orientation and the second threshold for the distance) to all the candidate points when searching for the two-point pair. When searching for the two-point pair, training data generator 130, however, may set the first threshold and/or the second threshold for the above-described connection conditions to be greater as the distance from the candidate point to the end point of the traveling route in the training traveling increases. In other words, training data generator 130 may relax the connection conditions for determining whether the candidate points correspond to the two-point pair for the candidate points away from the target parking position.

In general, a target parking position has narrow space around, but there is often more space available away from the target parking position. In other words, when traveling automatically, vehicle 1 can be guided to the target parking position without colliding with an obstacle even when vehicle 1 is slightly off from the traveling route of the training traveling at a position away from the target parking position, whereas vehicle 1 may collide with an obstacle when vehicle 1 is even slightly off from the traveling route of the training traveling around the target parking position.

When the two-point pair is searched according to Variation 2, the first threshold and/or the second threshold related to the above-described connection conditions are set to be greater as the distance from the candidate point to the end point of the traveling route in the training traveling increases, thereby more actively removing unnecessary routes.

(Variation 3)

In the embodiment described above, all points from the start point to the end point of the traveling route of the training traveling are search targets for the two-point pair searched by training data generator 130. However, when searching for the two-point pair, training data generator 130 may exclude, from the search targets, a point that has a curvature equal to or greater than the third threshold among the points on the traveling route of the training traveling. Note that the third threshold is, for example, a curvature that is converted from the limitation of the general steering angle of vehicle 1.

When vehicle 1 travels along a certain route, the curvature of the route needs to be equal to or less than a predetermined value in general because of the limitation of the steering angle of vehicle 1. After switch of the traveling direction, however, vehicle 1 is usually caused to travel along a route having a certain curvature, and thus connecting a point having a curvature of the predetermined value or more as one of the two-point pair possibly causes the curvature of the subsequent route to be excessively large. Consequently, vehicle 1 fails to travel along a target route and travels while deviating from the target route. Further, vehicle 1 possibly collides with an obstacle when such a situation occurs around the target parking position. This is because the target parking position usually has only narrow space around.

In this regard, limiting the search targets as in Variation 3 prevents the curvature of the target route from being too large.

Note that the curvature at each point determined in Variation 3 may be a curvature of the curve connecting between the point and its adjacent point, but may be a curvature of the curve connecting between the point and the target parking position. This case allows excluding only points around the target parking position from the search targets.

(Variation 4)

When the two-point pair satisfying the connection conditions is detected, training data generator 130 may determine whether to connect the two-point pair based on a selection operation of a user.

Figure 11:
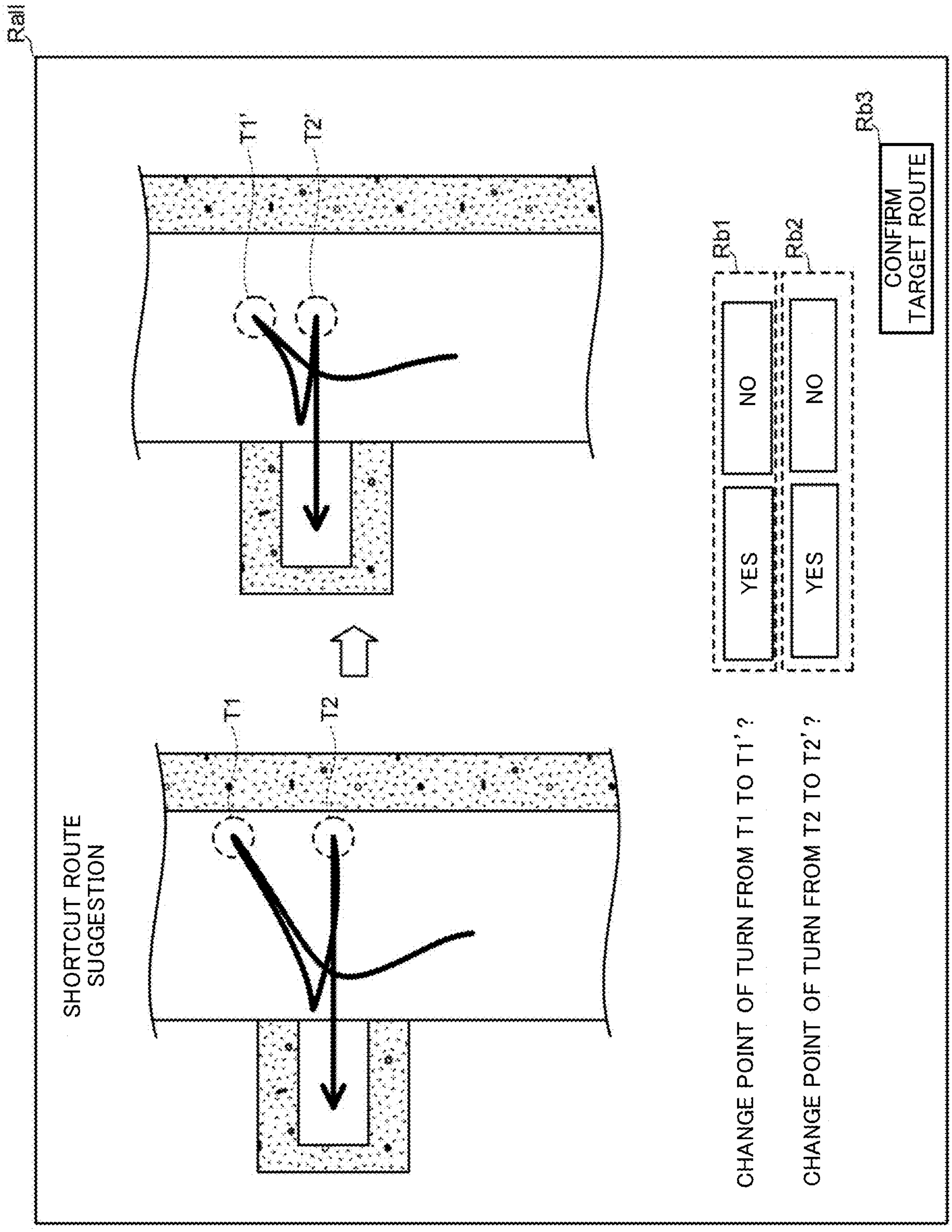
FIG. 11 illustrates an exemplary user interface display on an HMI for a selection operation of a user for the driving assistance apparatus according to Variation 4.

FIG. 11 illustrates an exemplary user interface display on HMI 60 for the selection operation of the user for driving assistance apparatus 10 according to Variation 4. Note that the left figure in FIG. 11 represents a traveling route of the training traveling, and the right figure in FIG. 11 represents a target route suggested by training driving data generator 130.

With a display as in FIG. 11, the user can select whether to change the route to the shortcut route for each of points of turn T1 and T2 while visually confirming the user interface screen. Note that Rb1, Rb2, and Rb3 in FIG. 11 are icons for an input operation of the user.

When a user drives vehicle 1 in the training traveling, the traveling route is intentionally selected by the user in some cases. For example, when the user intends to activate a monitoring sensor installed in a parking space by passing a predetermined position, configuring the target route by changing the traveling route of the training traveling to the shortcut route would be against the intention of the user.

According to Variation 4, the user can select and determine whether to configure the target route as the traveling route of the training traveling with no change or a route shortened at a position of the two-point pair satisfying the connection conditions among points on the traveling route in the training traveling. This enables configuring the target route in accordance with the intention of the user.

(Variation 5)

The above embodiment has described a case where training data generator 130 generates a target route for the automatic traveling by referring only to a traveling route of single training traveling and optimizing the traveling route. Training data generator 130, however, may generate a target route by referring to data of a traveling route of previous training traveling in addition to data of a traveling route of last training traveling, and combining both the data.

When parking driving for the training traveling is performed only once, the traveling route of the training traveling may include unnecessary routes unless the user is skilled in driving. In this regard, it would be highly convenient if an optimal traveling route is generated by performing the training traveling several times and combining the traveling routes. Driving assistance apparatus 10 according to Variation 5 responds to such a demand.

Figure 12:
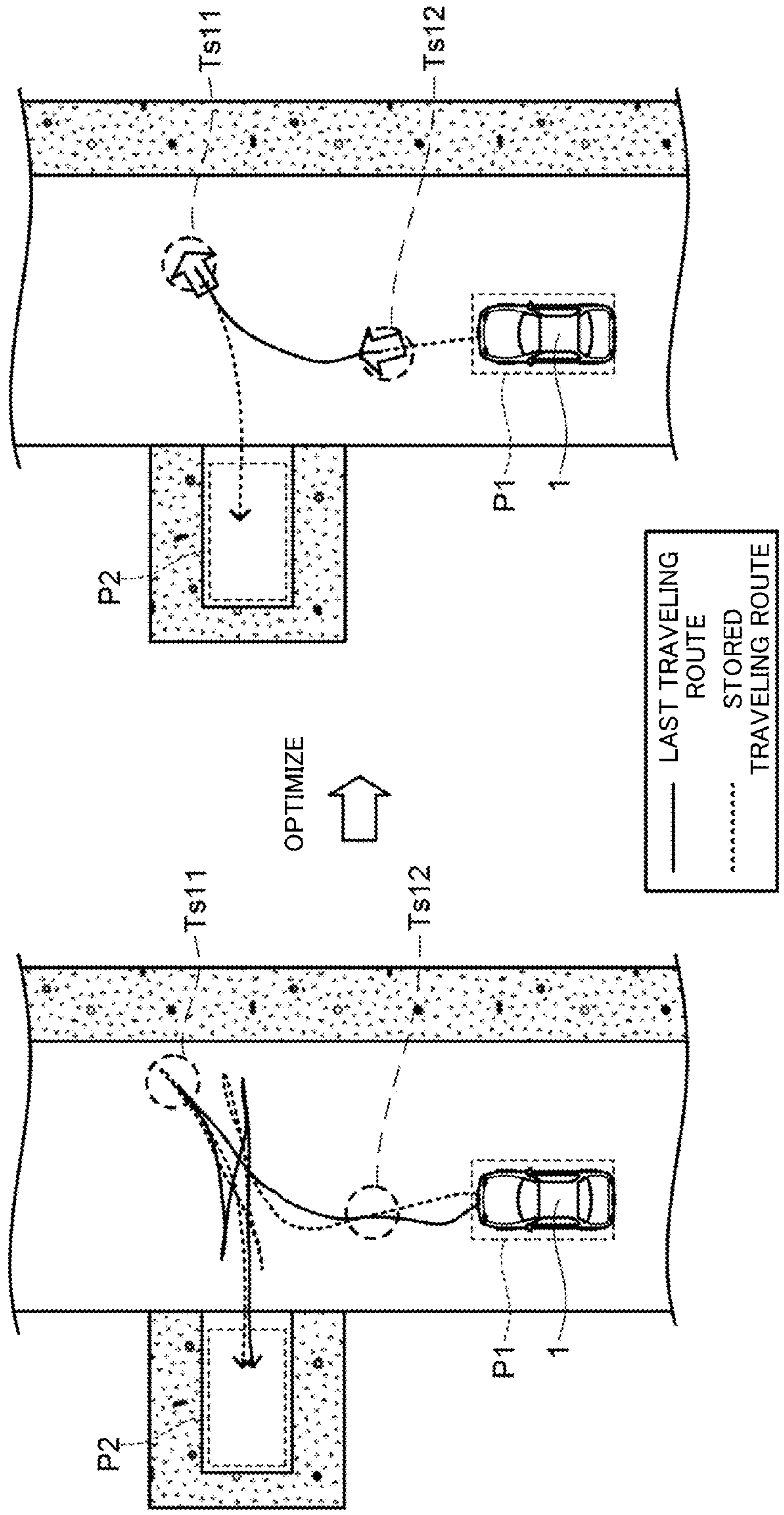
FIG. 12 is a diagram schematically illustrating processing in the training data generator according to Variation 5.

FIG. 12 is a diagram schematically illustrating processing in the training data generator according to Variation 5. The left figure in FIG. 12 illustrates a traveling route of the training traveling from certain position P1 outside the parking space to target parking position P2 in the parking space. The solid line indicates a traveling route of last training traveling, and the broken line indicates a traveling route of previous training traveling (i.e., stored data). The right figure in FIG. 12 illustrates a target route generated by combining the traveling route of last training traveling and the traveling route of previous training traveling.

For example, training data generator 130 compares the attitude of the vehicle at each point on the traveling route of last training traveling and the attitude of the vehicle at each point on the traveling route of previous training traveling, and searches for a point where the difference in the orientation is less than the first threshold and the distance is less than the second threshold. When detecting the point where the difference in the orientation is less than the first threshold and the distance is less than the second threshold, training data generator 130 regards the point as a candidate point where the traveling route of last training traveling and the traveling route of previous training driving are combined (hereinafter, also referred to as a "similar-attitude point").

Training data generator 130 selects either the traveling route of last training traveling or the traveling route of previous training traveling for each of the route from the start point to the candidate point, the route from the candidate point to the next candidate point, and the route from the next candidate point to the end point, for example, and generates the target route in which the traveling route of last training traveling and the traveling route of previous training driving are combined. At this time, training data generator 130 selects either the traveling route of last training traveling or the traveling route of previous training traveling by determining which of the traveling routes is optimal for the traveling route connecting each point, using an evaluation function based on the number of turns, and the distance, for example.

In FIG. 12, points Ts11 and Ts12 correspond to the candidate points where the difference in the orientation is less than the first threshold and the distance is less than the second threshold. In the right figure in FIG. 12, the traveling route of previous training traveling is selected for the route from the start point to candidate point Ts11, the traveling route of last training traveling is selected for the route from candidate point Ts11 to candidate point Ts12, and the traveling route of previous training traveling is selected for the route from candidate point Ts12 to the end point.

Figure 13:
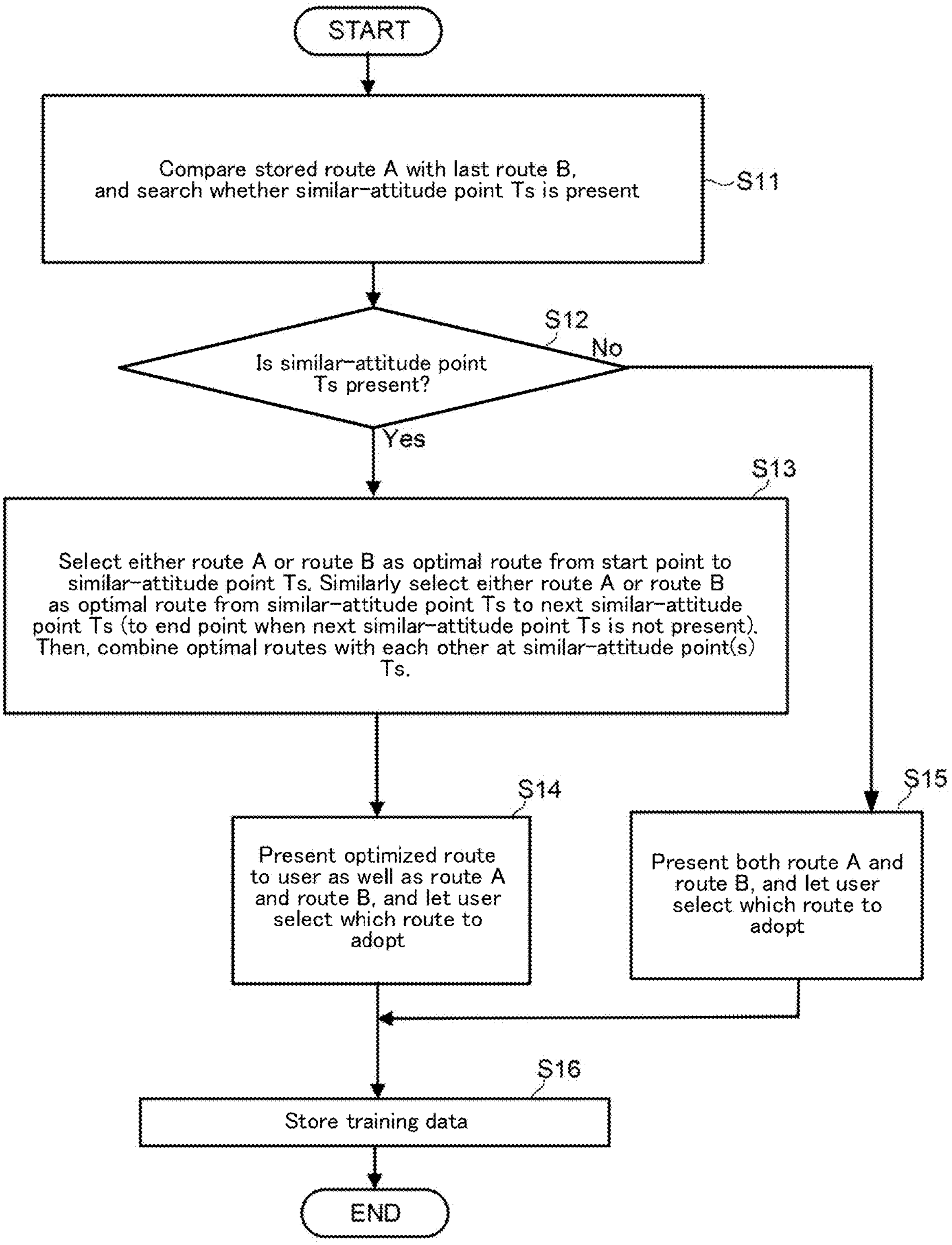
FIG. 13 is a flowchart describing an exemplary operation of the driving assistance apparatus for generating the target route, according to Variation 5.

FIG. 13 is a flowchart describing an exemplary operation when driving assistance apparatus 10 (training data generator 130) generates the target route, according to Variation 5.

In Step S11, driving assistance apparatus 10 compares stored route A, which represents the traveling route of previous training traveling, with route B, which represents the traveling route of last training traveling, and searches for similar-attitude point Ts (i.e., the point where the difference in the orientation is less than the first threshold and the distance is less than the second threshold).

In Step S12, driving assistance apparatus 10 determines whether similar-attitude point Ts is present. When similar-attitude point Ts is present, driving assistance apparatus 10 proceeds the processing to Step S13. When no similar-attitude point Ts is present, driving assistance apparatus 10 proceeds the processing to Step S15.

In Step S13, driving assistance apparatus 10 selects either route A or route B as an optimal route from the start point to similar-attitude point Ts. Driving assistance apparatus 10 then selects either route A or route B as an optimal route from similar-attitude point Ts to next similar-attitude point Ts (to the end point when next similar-attitude point Ts is not present). Subsequently, driving assistance apparatus 10 combines the optimal routes with each other at similar-attitude point(s) Ts. Driving assistance apparatus 10 performs such processing for all detected similar-attitude points Ts.

In Step S14, driving assistance apparatus 10 presents the route optimized in Step S13 to a user as well as route A and route B so that the user can select which route to adopt, and proceeds the processing to Step S16.

In Step S15, driving assistance apparatus 10 presents both route A and route B to the user so that the user can select which route to adopt, and proceeds the processing to Step S16.

In Step S16, driving assistance apparatus 10 stores the route selected by the user in external storage device 50 as the training data (i.e., the target route for automatic traveling).

As described above, the target route configuration method according to Variation 5 allows, in some cases, configuring a more optimal target route than the target route configuration method according to the above embodiment.

While various embodiments have been described herein above, it is to be appreciated that various changes in form and detail may be made without departing from the spirit and scope of the invention(s) presently or hereafter claimed.

The entire disclosure of Japanese Patent Application No. 2020-098600 filed on Jun. 5, 2020 is incorporated herein by reference in its entirety.

INDUSTRIAL APPLICABILITY

A driving assistance apparatus according to the present disclosure achieves a more suitable parking operation.

REFERENCE SIGNS LIST

1 Vehicle
10 Driving assistance apparatus
20 Vehicle driving apparatus
30 In-vehicle sensor
40 In-vehicle camera
50 External storage device
110 Vehicle information acquirer
120 Dead reckoner
130 Training data generator
140 Position estimator
150 Target route reader
160 Vehicle controller
D1 Training data
D2 Map data

What is claimed is:

1. A driving assistance method of performing automatic traveling of a vehicle based on a driving operation of a user, the driving assistance method comprising:
- storing a traveling route traveled by the vehicle according to the driving operation of the user in a training traveling mode;
- displaying the traveling route from a traveling start position to a target parking position in the training traveling mode; and
- displaying a target route from the traveling start position to the target parking position in an automatic traveling mode,
- wherein the target route in the automatic traveling mode is shorter than the traveling route in the training traveling mode,
- a first number of turns of the vehicle in the training traveling mode is same as a second number of turns of the vehicle in the automatic traveling mode,
- the traveling route includes a first turning point at a first position,
- the target route does not include the first turning point at the first position,
- the driving assistance method further comprises:
  - cutting unnecessary routes before and after the first turning point in the traveling route, in order to generate the target route; and
  - in the cutting of the unnecessary routes, identifying, according to connection conditions, a first point and a second point, the first turning point being included between the first point and the second point on the traveling route,
- wherein the connection conditions include a difference in the orientation of the vehicle at the first point and the second point in the traveling route being less than a first threshold, and a distance between the first point and the second point being less than a second threshold, and the driving assistance method determines a connection position between the first point and the second point as a second turning point in the target route instead of the first turning point in the traveling route, in order to generate the target route.

2. The driving assistance method according to claim 1, wherein the traveling route includes points of turn.

3. The driving assistance method according to claim 1, further comprising:

in the displaying of the target route, superimposing the target route in the automatic traveling mode on the traveling route in the training traveling mode.

4. The driving assistance method according to claim 3, wherein the target route is a shortcut route of the traveling route.

5. The driving assistance method according to claim 4, further comprising:

displaying an icon to select whether to change the traveling route to the shortcut route.

6. The driving assistance method according to claim 1, further comprising:

displaying all of the traveling route from the traveling start position to the target parking position in the traveling route by a solid line arrow.

7. The driving assistance method according to claim 1, further comprising:

parking the vehicle in a parking space.

8. The driving assistance method according to claim 1, wherein the target route includes the first turning point at a second position different from the first position.

9. The driving assistance method according to claim 1, wherein the target route does not include a first section in which a first route and a second route overlap each other by a predetermined distance in the traveling route.

10. The driving assistance method according to claim 9, wherein the vehicle travels forward in the first route, and the vehicle travels backward in the second route.

11. The driving assistance method according to claim 1, wherein the target route does not include a third turning point included in the traveling route, and in the target route, the vehicle travels from a first point, which is a predetermined point between the traveling start position in the target route and the third turning point, to a second point, which is a predetermined point between the third turning point and the target parking position in the target route.

12. The driving assistance method according to claim 11, wherein the target route does not include points of turn between the first point and the second point.

13. The driving assistance method according to claim 11, wherein the vehicle travels at a non-zero vehicle speed while traveling from the first point to the second point.

14. The driving assistance method according to claim 1, wherein the first threshold for the difference in the orientation of the vehicle is a value of at least 0 degrees and at most 3 degrees.

15. The driving assistance method according to claim 1, wherein the second threshold for the distance between the first point and the second point is a value of at least 0 meters and at most 1 meter.

16. The driving assistance method according to claim 1, wherein the connection conditions include the first point and the second point being a substantially same point on the traveling route with the vehicle including a substantially same orientation before and after the first turning point.

17. The driving assistance method according to claim 1, wherein a first route between the first point and the second point on the traveling route is not orthogonal to a second route before the first point on the traveling route and not orthogonal to a third route after the second point on the traveling route.

18. A non-transitory recording medium that stores a driving assistance program that is readable by a computer for performing automatic traveling of a vehicle based on a driving operation of a user, wherein the driving assistance program causes the computer to perform operations, the operations comprising:

storing a traveling route traveled by the vehicle according to the driving operation of the user in a training traveling mode;

displaying the traveling route from a traveling start position to a target parking position in the training traveling mode; and displaying a target route from the traveling start position to the target parking position in an automatic traveling mode, wherein the target route in the automatic traveling mode is shorter than the traveling route in the training traveling mode, a first number of turns of the vehicle in the training traveling mode is same as a second number of turns of the vehicle in the automatic traveling mode, the traveling route includes a first turning point at a first position, the target route does not include the first turning point at the first position, the operations further comprise:

cutting unnecessary routes before and after the first turning point in the traveling route, in order to generate the target route; and in the cutting of the unnecessary routes, identifying, according to connection conditions, a first point and a second point, the first turning point being included between the first point and the second point on the traveling route, wherein the connection conditions include a difference in the orientation of the vehicle at the first point and the second point in the traveling route being less than a first threshold, and a distance between the first point and the second point being less than a second threshold, and the driving assistance method determines a connection position between the first point and the second point as a second turning point in the target route instead of the first turning point in the traveling route, in order to generate the target route.

* * * * *